Patented Apr. 7, 1931

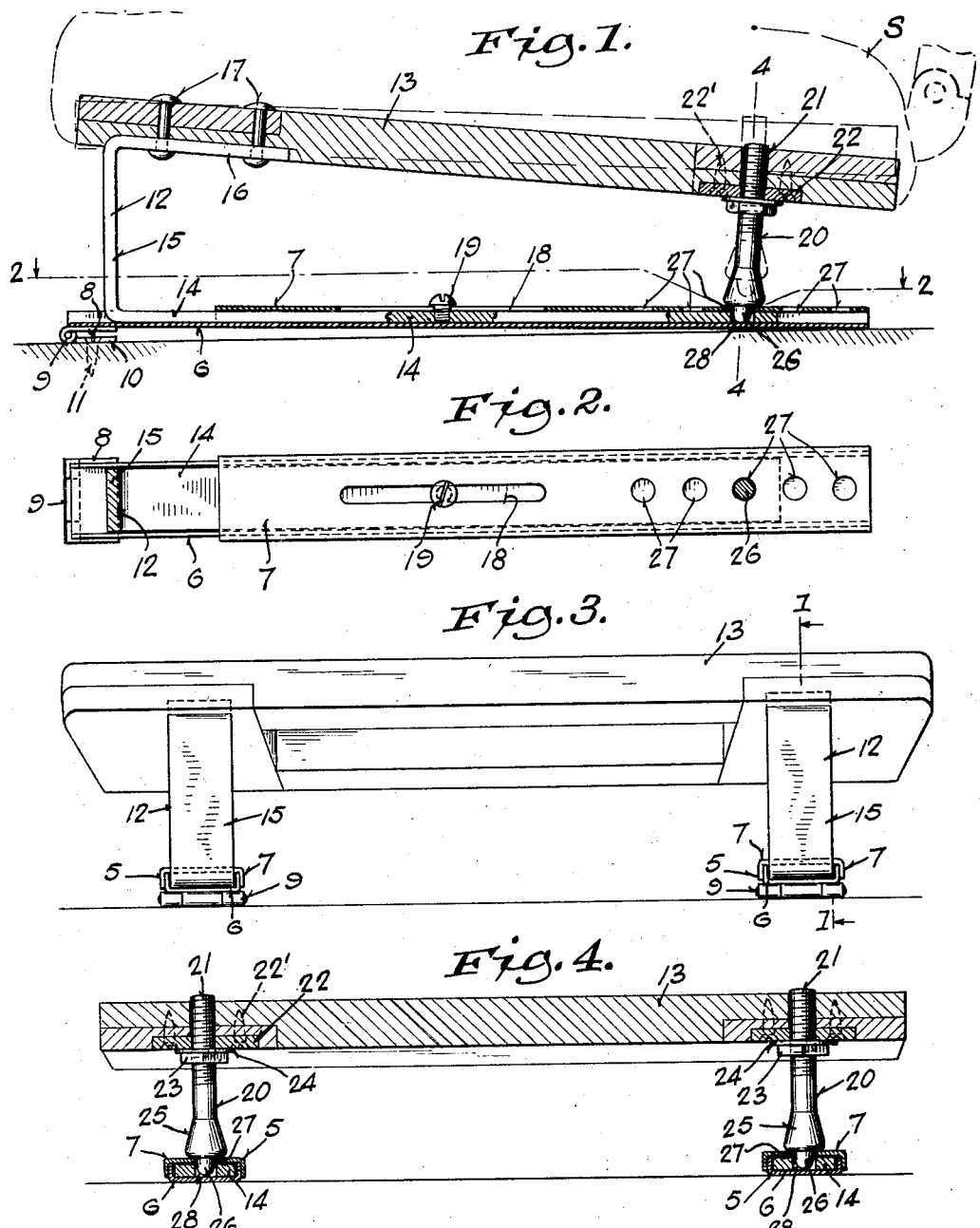

1,799,871

UNITED STATES PATENT OFFICE

HAROLD H. SEAMAN, OF MILWAUKEE, WISCONSIN, ASSIGNOR TO SEAMAN BODY CORPORATION, OF MILWAUKEE, WISCONSIN, A CORPORATION OF WISCONSIN

SHIFTABLE SEAT

Application filed July 13, 1928. Serial No. 292,478.

This invention relates to a shiftable seat construction for use on automobiles or the like and is especially designed and adapted for use with the coach and two-door sedan type of automobile body to facilitate entrance to and exit from the rear compartment although also well adapted for universal use and application.

One of the principal objects of the present invention is to provide a shiftable seat construction of this type which in its normal position in use is positively locked and held against any movement, but which is easily shifted longitudinally and held in any one of a number of adjusted positions, or which may be temporarily so shifted and positioned, while the occupant of the seat remains therein, as to provide ample space between the back of the seat and the rear door jamb whereby to facilitate entrance to and exit from the rear compartment. The occupant of the seat does not have to get out of the seat but remains therein and effects such shifting thereof as to make it easy and convenient for a passenger to enter or leave the rear compartment.

Another object of the invention is to provide a seat construction having these advantages and capacities and which is of simple and durable construction, reliable and effective in operation, easily adjusted and also easy and comparatively inexpensive to manufacture and install.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partly in side elevation and partly in longitudinal vertical section taken on line 1—1 of Figure 3 and showing one form of seat construction embodying the present invention;

Figure 2 is a view in horizontal section taken on line 2—2 of Figure 1;

Figure 3 is a view of the seat construction in front elevation; and

Figure 4 is a view in transverse section taken on line 4—4 of Figure 1.

Referring to the drawings, it will be seen that a seat construction embodying the present invention proposes a mounting comprising a pair of floor guides designated generally at 5 which are located parallel to each other and are supported on and extend longitudinally of the floor of the vehicle. These floor guides 5 are of identical construction and each is made up of a pair of channel-shaped guide strips designated at 6 and 7. The guide strip 6 is disposed in upright position next to the floor while the guide strip 7 is inverted and is of such size that its side flanges overlap the side flanges of the guide strip 6. Further, the guide strip 7 is of less length than the guide strip 6 and terminates short of the forward end thereof as illustrated in Figures 1 and 2. The forward end of the guide strip 6 is welded or otherwise suitably secured to a hinge ear 8 pivotally connected as at 9 to a hinge ear 10 secured by suitable fastening means such as screws 11 to the floor boards. The channel-shaped guide strips 6 and 7 are welded or otherwise suitably secured together and provide a tubular guide.

A pair of combined guiding and supporting members designated generally at 12 are positioned between the forward end of the base or frame 13 of a seat 3 and the floor guides 5, these combined guiding and supporting members 12 being located adjacent the opposite sides of the seat as shown in Figure 3 and being of identical construction.

Each combined guiding and supporting member 12 is of substantially J-shaped form and includes a guide bar 14 slidably interfitted with the tubular guide afforded by the channel-shaped guide strips 6 and 7. At its forward end this guide bar 14 is integrally formed with a supporting member or section 15. At its upper end this supporting member 15 is integrally formed with a rearwardly directed attaching portion 16 secured by rivets 17 or other suitable fastening means to the base or frame of the seat 13.

To limit the extent of the sliding movement of the seat relative to the floor guides, each channel shaped strip 7 is provided in its body portion with a longitudinal slot 18 in which a screw or stud 19 operates, the screw or stud being threaded into the associated guide bar 14. As the screw or stud 19 has a sliding fit in the slot 18 it does not interfere with the longitudinal shifting or adjustment of the seat, but it is engageable with the end walls of the slot 18 to limit the extent of this adjustment.

Adjacent the rearward end of the base or frame 13 of the seat, a pair of combined supporting legs and locking members designated generally at 20 are provided and are disposed adjacent the opposite sides of the seat and in co-operative relation to the floor guides as illustrated in Figure 4. Each combined leg and locking member 20 has a threaded shank 21 engaged with the internally threaded opening provided therefor in a mounting plate 22 embedded in a recess formed in the under side of the base or frame 13 and secured in position therein by fastening means such as screws 22'. A lock nut 23 and washer 24 co-act with the shank 21 and with the plate 22 to maintain the combined supporting legs and locking members 20 in adjusted position. Adjacent their lower ends these combined supporting legs and locking members 20 are enlarged as at 25 and below the enlargements are formed with reduced extensions or locking studs 26 selectively co-operable with any one of a plurality of keeper openings 27 formed in the channel guide strip 7. The guide bar 14 is provided with a keeper opening 28 which also receives the locking stud 26. The combined supporting and guiding members 12 are constituted of metal having sufficient strength and stiffness to support the forward end of the seat, even when occupied, without any appreciable or material flexion in the supporting members or sections 15 thereof, but this metal has an appropriate degree of resiliency so that when the occupant of the seat grasps the side of the seat adjacent the rear end thereof and sways his body forwardly and pulls upwardly on the rear end of the seat, the supporting members or sections 15 will flex sufficiently to permit the seat to move to the position shown in dash lines in Figure 1, thereby disengaging the locking studs 26 from the keeper openings 27 and 28 and freeing the seat for longitudinal shifting movement. This longitudinal shifting movement may be effected by the occupant of the seat by moving his body forwardly or rearwardly depending upon the direction in which it is desired to shift the seat. The seat responds to this impulse as the supporting bars 14 are freely slidable in the floor guides provided by the channels 6 and 7. If the shifting is effected to provide the space required to facilitate access to the rear compartment, the seat is returned to its previous adjustment or position before it is again locked against shifting movement. Locking of the seat against shifting movement is effected by relieving the supporting legs 15 of the flexion impressed thereon and the occupant of the seat does this simply by relieving and releasing his grip on the side of the seat. This permits the supporting legs 15 to straighten out and throws the locking studs 26 back down against the channel guide strips 7 and into the underlying and registering keeper openings 27 and 28. The provision of a plurality of keeper openings 27 provides for the securing of the seat in any one of a plurality of longitudinal adjustments, a feature especially desirable in connection with the driver's seat, although also advantageous in connection with either front seat as well as with seats otherwise located. The adjustability of the combined supporting and locking members 20 permits these members to be set or adjusted to obtain easy release and locking of the seat.

With this construction the occupant of the seat may remain in the seat and yet shift the same longitudinally to permit a passenger to enter or leave the rear compartment. While having this advantage, a very simple and comparatively inexpensive construction is had. The capacity which the seat posseses for tilting movement to release the locking means provided by the studs 26 and the keeper openings 27 and 28 is afforded by the limited flexibility or resiliency of the supporting members 15 so that the necessity for employing hinges for this purpose is avoided. When it is desired to swing the entire seat and mounting forwardly and out of the way to remove the floor boards or for other purposes, this may be easily accomplished due to the provision of the hinges between the forward ends of the floor guides and the floor.

I claim:

1. In combination, a seat, floor guides, combined guiding and supporting members secured to the seat and co-operable with the floor guides to support the seat for shifting movement, and combined locking and supporting members secured to the seat and operable to hold the seat releasably against shifting movement, said guiding and supporting members having portions sufficiently stiff to support the seat and sufficiently yieldable to permit such flexion thereof as to release said combined locking and supporting members.

2. In combination, a seat, floor guides, combined guiding and supporting members secured to the seat adjacent its forward end and co-operable with the floor guides, combined supporting legs and locking members secured to the seat adjacent its rearward end and co-operable with the floor guides and with the combined guiding and supporting members to releasably lock the seat against shifting movement, said combined guiding and supporting members having portions sufficiently flexible to permit the seat to be tilted to disengage the combined supporting legs and locking members whereby to free the seat for longitudinal shifting.

3. In combination, a seat, tubular floor guides hingedly connected at their forward ends to the floor boards, combined guiding and supporting members secured to the seat adjacent its forward end and having portions constituting guide bars and interfitted with the tubular floor guides and also having portions constituting supporting portions extending between the guide members and the seat provided with attaching portions secured to the seat, co-operating means between the guide bars and the tubular guides for limiting the relative longitudinal adjustment thereof, said guide bars and said tubular guides having registering openings, and combined supporting legs and locking members adjustably connected to the seat and having locking studs co-operable with the registering openings, said legs being sufficiently flexible to permit the seat to be tilted to disengage the locking studs from the registering openings.

4. In combination, a seat, tubular floor guides, hingedly connected at their forward ends to the floor boards, combined guiding and supporting members secured to the seat adjacent its forward end and having portions constituting guide bars and interfitted with the tubular floor guides and also having portions constituting supporting portions extending between the guide members and the seat provided with attaching portions secured to the seat, said guide bars and said tubular guides having registering openings and combined supporting legs and locking members connected to the seat and having locking studs co-operable with the registering openings, said legs being sufficiently flexible to permit the seat to be tilted to disengage the locking studs from the registering openings.

5. In combination, a seat, tubular floor guides hingedly connected at their forward ends to the floor boards, combined guiding and supporting members secured to the seat adjacent its forward end and having portions constituting guide bars and interfitted with the tubular floor guides and also having portions constituting supporting portions extending between the guide members and the seat provided with attaching portions secured to the seat and combined supporting and locking means connected with the rearward portion of the seat and operable to hold the seat against longitudinal shifting movement in the normal position of the seat, said supporting portions being sufficiently flexible to permit limited tilting of the seat under the control of the operator, to release said supporting and locking means and free the seat for longitudinal shifting.

6. A mounting for a vehicle seat including interfitted guides adapted to be supported on the floor of a vehicle and adjustable longitudinally with respect to each other and a connection between certain of the guides and the vehicle seat having a limited degree of flexibility to permit tilting of the vehicle seat and means for normally holding the vehicle seat against longitudinal shifting, said means being released upon tilting of the seat.

7. A shiftable seat for use in a vehicle, comprising a seat and a mounting therefor adapted to be secured to the floor of the vehicle and supporting elements at one end of the seat, combined leg and latch elements at the opposite end of the seat and rigidly secured thereto, stop means on the mounting normally engaging with the combined leg and latch elements to prevent shifting of the seat, the said elements connecting the seat with the mounting and supporting the seat above the mounting in vertical spaced relation thereto, said elements extending between the seat and the mounting in the space between the same, said supporting elements being flexible and permitting a limited back and forth tilting thereof sufficient to release the seat at the latch elements from the mounting, said supporting elements being slidably connected with the mounting to permit shifting of the seat when in forward tilted position.

8. In combination, a vehicle seat, floor guides disposed beneath the seat and arranged to extend in a direction from front to rear thereof, said guides being hingedly connected to the floor of the vehicle adjacent the front edge of the seat, guide elements co-operable with the floor guides and shiftable along the same, flexible supporting elements connected to the guide elements and the seat, and means co-operable with the seat and the floor guides in the usable position of the seat to hold the same against shifting along the floor guides, said means in the forward tilting of the seat on the flexible supporting elements releasing the seat for shifting along the floor guides.

9. A shiftable seat for use in a vehicle, comprising a seat and a mounting therefor adapted to be secured to the floor of the vehicle beneath the seat, and supporting the latch elements at the opposite ends of the seat for connecting the seat with the mounting and supporting the seat above the mounting in vertical spaced relation thereto, said elements extending between the seat and the mounting and confined within the space between the same with the supporting elements flexible whereby the seat may be tilted back and forth thereon, said latch elements being in the form of legs carried by the seat and being released from the mounting in the forward tilting of the seat, said supporting elements having slidable connection with the mounting to permit shifting of the seat along the mounting when the legs are released therefrom, said legs in the usual position of the seat having interlocking engagement with the mounting to prevent shifting of the seat thereon.

In witness whereof, I hereto affix my signature.

HAROLD H. SEAMAN.